Jan. 30, 1945. G. A. LYON 2,368,234
WHEEL STRUCTURE
Filed Dec. 29, 1941
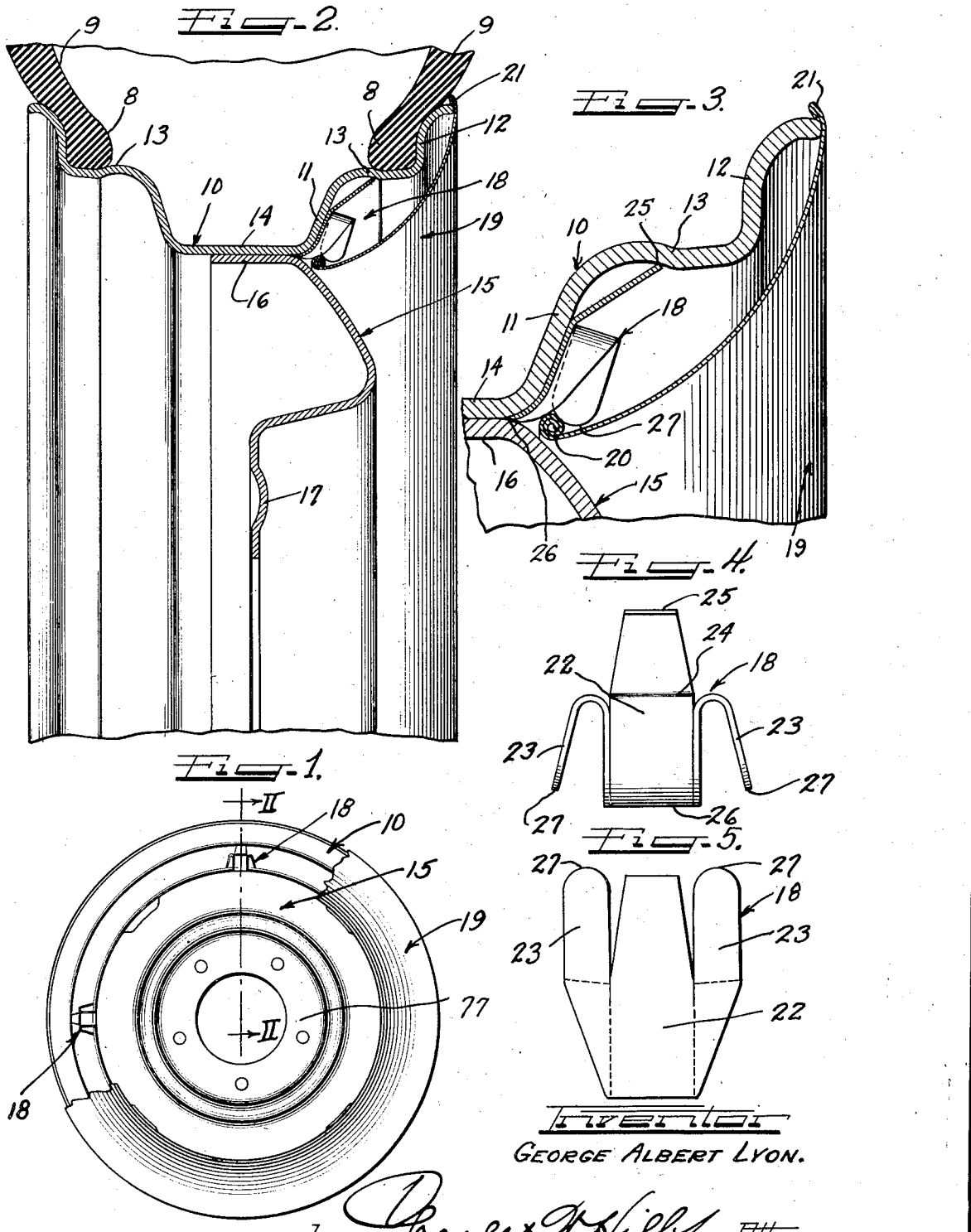
Inventor
GEORGE ALBERT LYON.

Patented Jan. 30, 1945

2,368,234

UNITED STATES PATENT OFFICE 2,368,234

WHEEL STRUCTURE

George Albert Lyon, Allenhurst, N. J.

Application December 29, 1941, Serial No. 424,682

10 Claims. (Cl. 41—10)

This invention relates to a wheel structure, and more particularly to a novel structure for retaining a wheel cover on a wheel which structure includes spring clips held on the wheel solely by reason of their engagement with parts of the wheel.

An object of this invention is to provide a simple and inexpensive way of retaining a wheel cover, such as a trim ring, on a wheel.

Another object of this invention is to provide a novel spring clip for use in the retention of a trim ring on a wheel, which clip is adapted to cooperate retainingly at its opposite ends with the rim and body parts of a wheel, and which clip is held on the wheel solely by reason of its engagement with said parts.

In accordance with the general features of this invention, there is provided in a wheel structure, including a multi-flanged tire rim part and a body part joined thereto, spring clip means for holding a wheel cover member on the wheel comprising a plurality of spaced clips each including a generally radially extending strip disposed over a flange of the rim part and having an outer edge wedged into engagement with an annular flange of the rim part and an inner edge wedged into engagement with the body part adjacent the junction of the wheel parts; this strip having a pair of intermediate lateral resilient projections each formed with a free extremity arranged to be engaged by a shoulder on a cover member for holding the cover member on the wheel.

In accordance with other features of this invention, there is provided a novel wheel cover retaining spring clip comprising a strip of metal having oppositely turned edges for wedging engagement with parts of a wheel and having between said edges oppositely turned resilient fingers each provided with a shoulder at right angles to the plane of the strip and arranged to be resiliently spread apart when pressed against an edge of a wheel cover member as to cooperate retainingly therewith.

Other objects and features of this invention will more fully appear from the following detailed description taken in connection with the accompanying drawing which illustrates a single embodiment thereof, and in which:

Figure 1 is a plan view, partly broken away, of a wheel structure embodying the featutres of this invention;

Figure 2 is an enlarged fragmentary cross sectional view taken on the line II—II of Figure 1 looking in the direction indicated by the arrows;

Figure 3 is an enlarged fragmentary cross sectional view corresponding to the upper right hand portion of Figure 2, and illustrating clearly the manner in which the spring clips cooperate with the rim and body parts of the wheel;

Figure 4 is a front elevation of one of the retaining clips showing the resilient ears which are adapted to be spread apart to apply a tensioned grip on a wheel cover;

Figure 5 is a view of a metallic blank made from sheet metal and showing the construction of the fingers of the spring clip prior to their being bent to one side of the clip into the form shown in Figures 3 and 4.

As shown on the drawing:

The reference character 10 designates generally a multi-flange drop center type of tire rim part which is shaped to accommodate in the usual way a tire 9 having beads 8 seated in axial flanges of the rim part and behind shoulders 13 formed in said axial flanges. The rim part also includes generally radially extending side flanges 11 and 12. These flanges are concealed by an annular cover member or trim ring 19 held on the wheel by a snap-on engagement with a plurality of spaced identical spring clips 18, which may be four in number, embodying the features of this invention.

It should also be noted that the rim part 10 includes a base flange 14 attached to a flange 16 of the body part 15 which includes the usual central bolt-on flange 17.

The trim ring 19 is made from sheet metal and includes a turned outer edge 21 adapted to overlie the outer extremity of a side flange 12 of the rim part and to be positioned alongside of the side wall of the tire 9 as shown in Figure 2. The inner peripheral edge of this trim ring 19 is turned or curled a plurality of times upon itself to form a reinforced beaded edge 20 which is adapted to cooperate retainingly with the spring clips 18 of my invention, which will now be described in detail.

First, it should be noted, as shown in Figure 1, that these clips are spaced circumferentially from each other, and there may be any suitable number employed, although I have obtained excellent results by using four of them.

Each of the spring clips 18 is made from sheet metal, preferably spring steel, and embodies a strip 22 and side ears or fingers 23—23. In Figures 5, I have illustrated the construction of the clip 18 in the flat or, in other words, prior to its being bent from sheet or strip form into the ultimate shape shown in Figures 3 and 4. Any suitable equipment may be employed for bending the clip into the ultimate desired shape. During the bending of forming operations, the central or main strip 22 of the material is given an intermediate bend at 24, so that one extremity 25 of the clip extends in one direction. The other extremity of the strip 22 is then bent in an opposite direction, as indicated at 26. In other words, the two extremities 25 and 26 are bent in opposite directions, the extremity 25 being formed for snap on engagement with a flange of the tire rim part 10 adjacent the shoulder 13, and the other extremity 26 being arranged for wedging engagement with the flange 16 of the body part 15 at the junction of the two parts 10 and 15.

The lateral ears 23—23 are bent out of the plane of the strip 22 and then are turned in opposite directions as shown in Figure 4. Each of these ears 23 has a curved outer edge or extremity 27 and thus provides a resilient shoulder over which the beaded edge 20 of the trim ring is adapted to be pressed to be retained on the wheel.

Each of the spring clips 18 is held on the wheel solely by reason of its engagement with the flange of the rim part and the flange of the body part. In other words, each clip is pressed axially against the side of the wheel until its opposite edges are snapped into tight tensioned retaining engagement with the two wheel parts. This retaining engagement is secured by reason of the particular configuration of the clip, as well as the fact that the extremities 25 and 26 thereof are bent in opposite directions, and hence when the clip is pressed against the wheel, these extremities are under tension and retain the clip on the wheel.

In the application of the cover member or trim ring 19, it is placed over the wheel and pressed axially, so that its beaded edge 20 rides over the high point of the curved extremities 27 of each of the two ears 23—23 on the clip. In other words, the beaded edge 20 is snapped over and behind these curved edges or shoulders 27, so that the trim ring is held on the wheel solely by reason of its engagement with these ears of the spring clips.

It should be noted that in this application of the cover member to the clips the ears 23—23 thereof tend to spread slightly thus exerting resilient gripping pressure on the beaded edge 20.

The turning or curling of the beaded edge 20 so that it comprises a plurality of turns does not per se constitute a part of this invention but is being covered in a separate copending application. It should be noted that by reason of this curved edge I am enabled to use thinner and low carbon steel in the ring 19, since this multiple curling of the edge provides it with greater rigidity or, at least, rigidity sufficient to cause the edge not to be buckled out of shape when it is pressed home into retained engagement with the spring clips.

It will, of course, be appreciated that due to the fact that the trim ring 19 has a relatively large diameter in that it cooperates with the rim of the wheel, its inner edge would be susceptible to considerable buckling when thin metal is used if it were not for the fact that the edge is reinforced by the multiple curling or turning of the same into the bead 20.

It is easy to remove the trim ring 19 from the wheel by merely inserting a pry-off tool under the beaded edge 20 and prying the ring loose from its retained cooperation with these spring clips. In this prying operation, the strengthening or rigidifying of the edge by the multiple layers serves to prevent distortion of the edge due to the pressure of the pry-off tool applied thereto.

By reason of the fact that the trim ring extends clear from the body part 15 over the outer edge of the flange 12, the trim ring, if given a white or eggshell finish, causes the ensuing wheel to have the appearance of having a white sidewall. That is to say, the trim ring 19 is of such configuration and arrangement that, when it is colored white, it appears to constitute a part of the sidewall of the tire and thus give the effect of there being a tire with a white sidewall. This feature, however, is likewise being covered in a separate copending application.

Each of the spring clips is removable by inserting the end of a pry off tool or screwdriver under the outer portion of the clip and forcibly prying it free of its engagement with the wheel parts. The clip, however, requires less pressure or force to put it on than to take it off. Similarly, the cover 19 requires more effort to pry it off of the wheel than to press it into engagement with the clip. It is what may be called "an easy on but hard off cover."

I claim as my invention:

1. In a wheel construction including a multi-flanged tire rim part and a body part joined thereto, spring clip means for holding a wheel cover member on the wheel comprising a plurality of spaced clips each including a generally radially extending strip disposed over a flange of the rim part and having an outer edge snapped into engagement with an annular flange of the rim part and an inner edge wedged into engagement with said body part adjacent the junction of said wheel parts, said strip having intermediate oppositely curled resilient projections each providing a shoulder to be engaged by a cover member for holding the cover member on the wheel.

2. In combination, a wheel including a multi-flanged wheel rim part and a body part joined thereto, and a wheel cover retaining spring clip disposed alongside a side flange of said rim part and having inner and outer edges spring wedged into retained engagement with said wheel parts, said engagement constituting the sole means for holding the clip on the wheel, said clip having formed on an intermediate portion thereof between said inner and outer edges downwardly bent spring means each providing a curved shoulder over which the shoulder of a cover member is adapted to be pressed for retention on the wheel.

3. In combination, a wheel including a multi-flanged wheel rim part and a body part joined thereto, and a wheel cover retaining spring clip disposed alongside a side flange of said rim part and having inner and outer edges spring wedged into retained engagement with said wheel parts, said engagement constituting the sole means for holding the clip on the wheel, said clip having spaced resilient lateral side ears adapted to be resiliently spread apart when engaged by a shoulder of a cover member so as to apply tensioned retaining pressure thereto.

4. In combination, a wheel including a multi-flanged wheel rim part and a body part joined thereto, and a wheel cover retaining spring clip disposed alongside a side flange of said rim part and having inner and outer edges spring wedged into retained engagement with said wheel parts, said engagement constituting the sole means for holding the clip on the wheel, said clip having an intermediate shoulder arranged for retaining cooperation with a wheel cover member, said intermediate shoulder comprising a curved spring finger bent laterally from the body of the spring clip and having a curved extremity over which the edge of a cover member is adapted to be pressed for retention on the wheel.

5. As an article of manufacture, a spring clip for retaining a wheel cover member on a wheel comprising a strip of metal having oppositely turned edges for wedging engagement with parts of a wheel and having between said edges a shoulder for retaining cooperation with an edge of a wheel cover member, said strip also having bent laterally therefrom and in a direction away from the wheel oppositely turned fingers each terminating in said shoulder arranged to cooperate with an edge on a wheel cover for the purpose of retaining the cover member on a wheel.

6. As an article of manufacture, a spring clip for retaining a wheel cover member on a wheel comprising a strip of metal having oppositely turned edges for wedging engagement with parts of a wheel and having between said edges a shoulder for retaining cooperation with an edge of a wheel cover member, said strip also having bent laterally therefrom and in a direction away from the wheel oppositely turned fingers each terminating in said shoulder arranged to cooperate with an edge on a wheel cover for the purpose of retaining the cover member on a wheel, said fingers being constructed and arranged to be resiliently spreadable upon engagement by the wheel cover to apply a tensioned retaining pressure thereon.

7. As an article of manufacture, a wheel cover retaining spring clip having oppositely turned resilient ears spreadable apart for tensioned retaining engagement with a portion of a cover member an intermediate finger means between the ears for resilient cammed engagement with the wheel.

8. In a wheel structure including a body part and a flanged rim part carrying a tire, a circular wheel trim comprising an annular ring portion positioned over the outer side of the wheel and of such a curved cross-sectional configuration as to substantially cover the exposed side flanges of the rim part and of such width as to extend radially outwardly beyond the side flanges and over a portion of the side wall of the tire and to extend to a point radially inwardly of the junction of the wheel parts, said portion being intermediately bowed into a curved plane constituting a continuation of the curved plane of the outer side surface of the tire on the rim part so as to provide the effect of said portion appearing to be a portion of the tire, and concealed means for retaining the wheel trim on the wheel.

9. The wheel structure of claim 8 further characterized by said portion having a reinforced outer peripheral edge overhanging the outer edge of the tire rim flange concealed by said wheel trim.

10. The wheel structure of claim 8 further characterized by said portion having a reinforced inner edge radially inward of the junction of the wheel parts and disposed over the wheel body part, said edge cooperating with the concealed means in the retention of the wheel trim on the wheel.

GEORGE ALBERT LYON.